Figure 1:
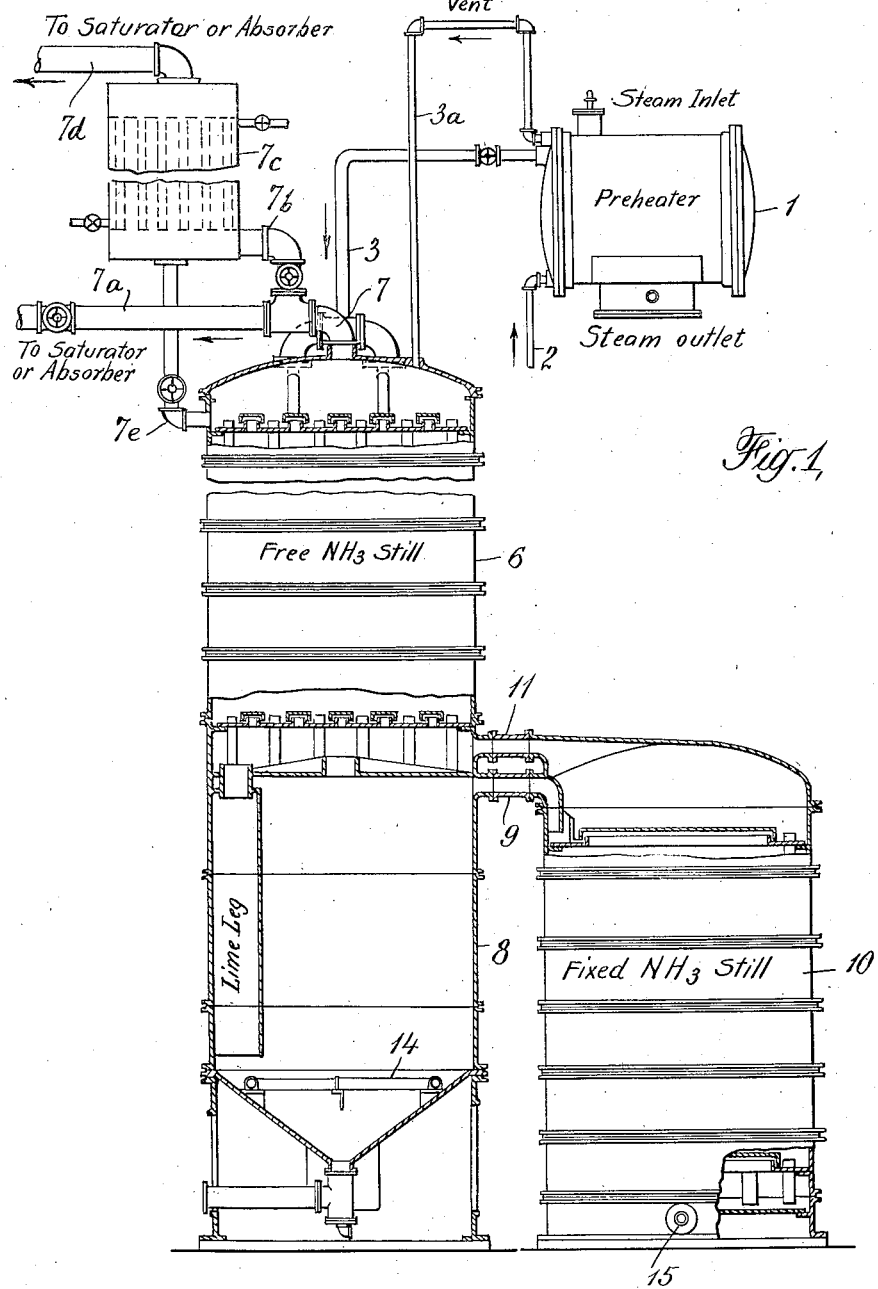

Aug. 10, 1926. 1,595,603
LE ROY W. HEFFNER ET AL
APPARATUS FOR RECOVERING PHENOLS FROM AMMONIACAL LIQUOR
Original Filed Dec. 16, 1924  4 Sheets-Sheet 1

INVENTORS
Le Roy W. Heffner
William Tidey
BY
Pennie Davis Marvin Edmonds
ATTORNEYS

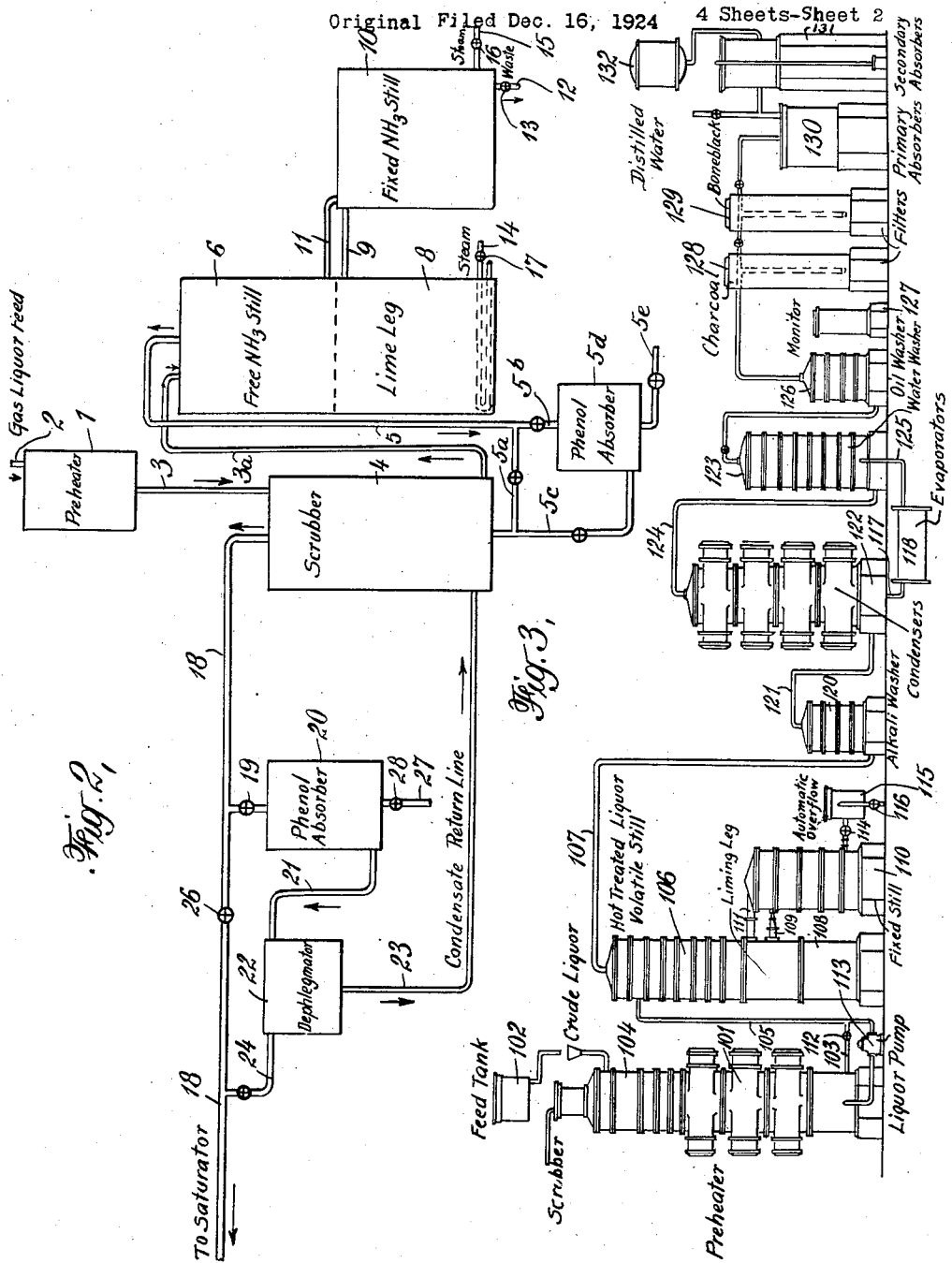

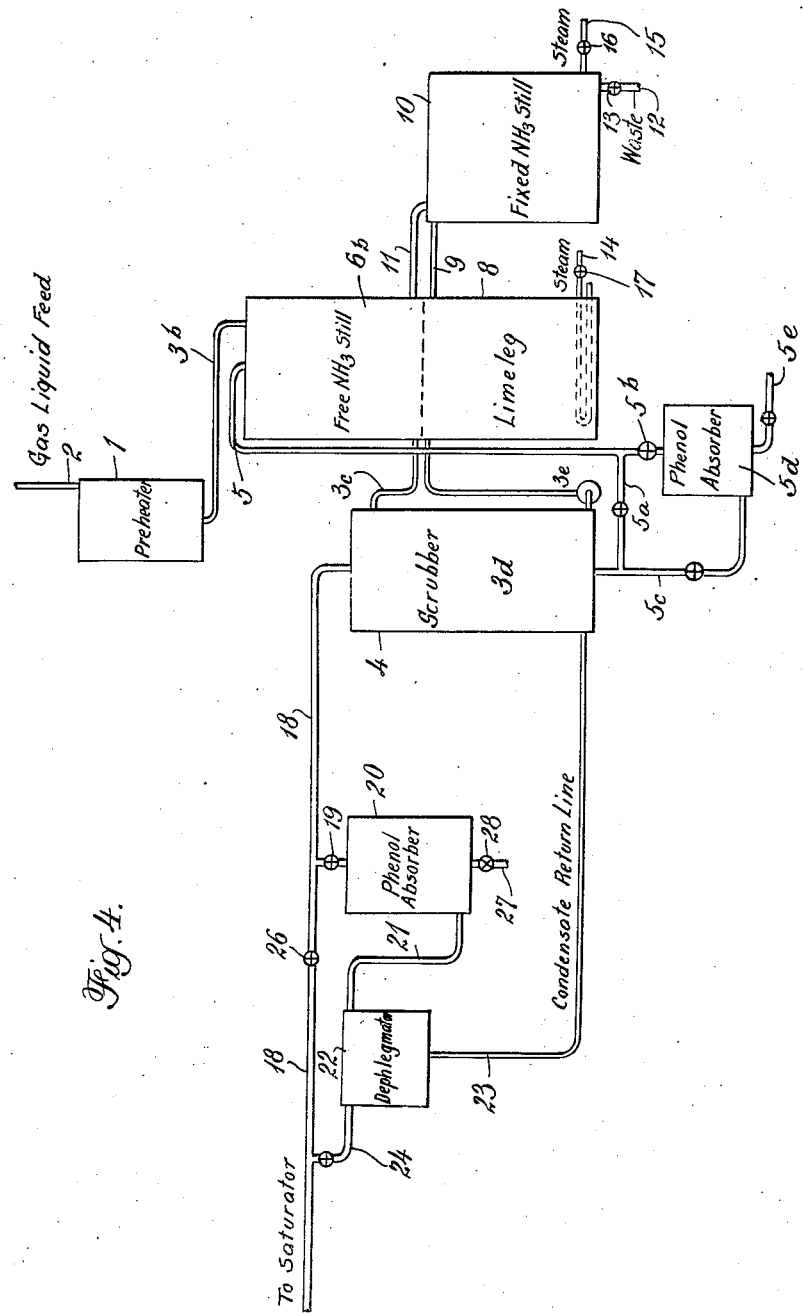

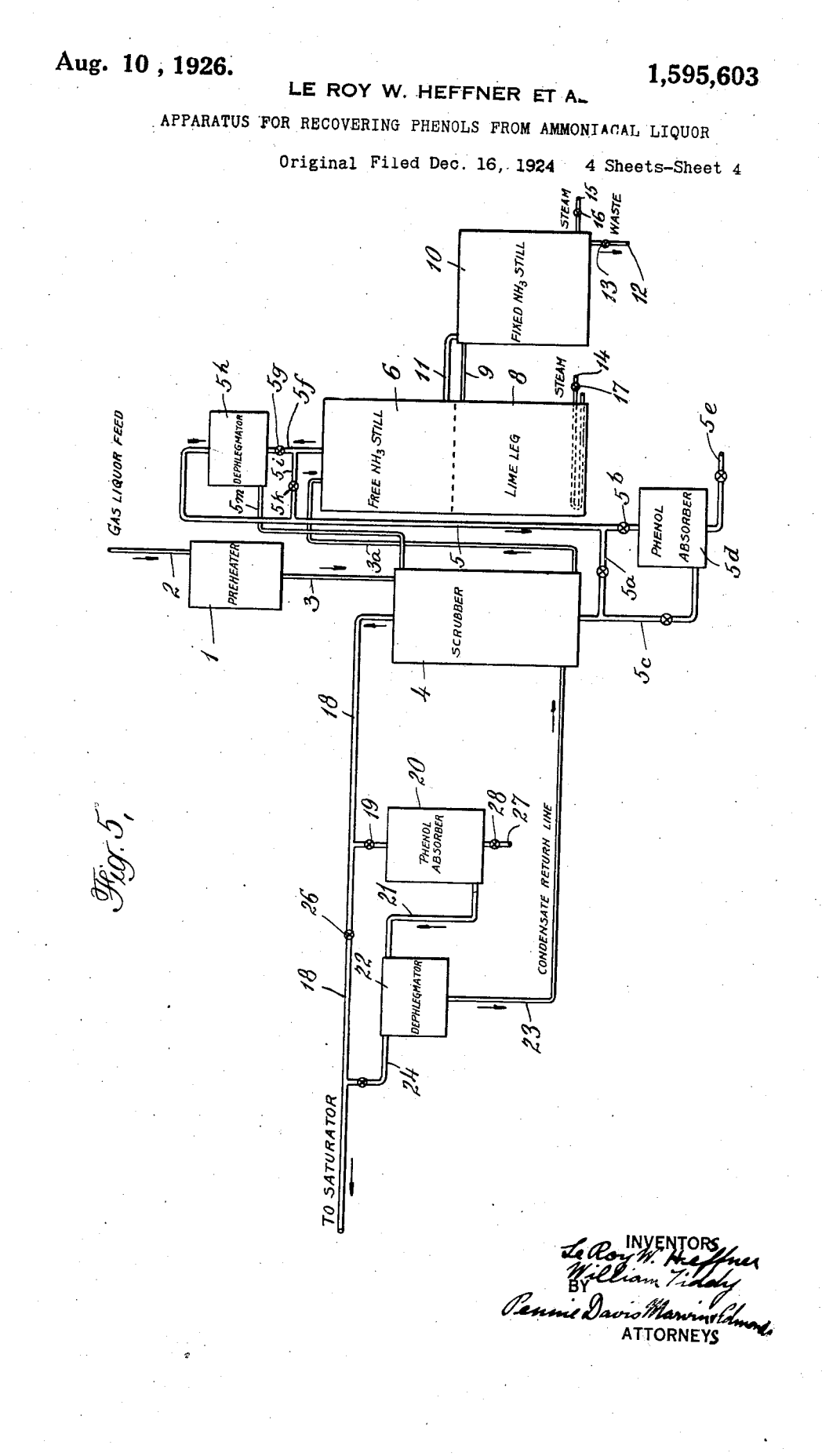

Patented Aug. 10, 1926.

1,595,603

UNITED STATES PATENT OFFICE.

LE ROY WILBUR HEFFNER, OF EAST NORRISTOWN TOWNSHIP, MONTGOMERY COUNTY, AND WILLIAM TIDDY, OF JEFFERSONVILLE, PENNSYLVANIA, ASSIGNORS TO RAINEY-WOOD PROCESS CORPORATION, OF NEW YORK, N. Y., A CORPORATION OF DELAWARE.

APPARATUS FOR RECOVERING PHENOLS FROM AMMONIACAL LIQUOR.

Original application filed December 16, 1924, Serial No. 756,194, Patent No. 1,566,796. Divided and this application filed December 22, 1925. Serial No. 77,100.

This invention refers to an improved apparatus for recovering phenols from ammoniacal gas liquor, etc., and particularly to an apparatus for carrying out the process of our prior application Serial No. 756,194 filed December 16, 1924, the present application being a division of such application (now Patent No. 1,566,796).

The invention is illustrated in the accompanying drawings, showing certain embodiments thereof, but the invention is not limited thereto.

In the drawings, Fig. 1 shows an ammonia still parts being broken away to show the interior construction; Fig. 2 illustrates, somewhat conventionally and diagrammatically, another arrangement of apparatus in the nature of a flow sheet; Fig. 3 shows in elevation an aqua-ammonia apparatus, adapted for carrying out the invention; Fig. 4 shows a modified apparatus; and Fig. 5 shows still another modified type of the apparatus.

The apparatus of Fig. 1 includes an ammonia still having heating means sufficient to maintain the temperature of the vapors and liquid at the top of the free ammonia still sufficiently high e. g., around 98 to 103° C.

The still includes a preheater 1, heated by steam and having a gas liquor feed pipe 2, and a supply pipe 3 for conveying the preheated liquor to the top of the free ammonia still 6. A vent pipe 3ª is provided for the escape to the top of the still 6, of any vapors formed in the preheater. The still has the usual lime leg 8, having steam heating coil 14. The fixed ammonia still 10 is connected with the lime leg through the connecting pipe 9 and the ammonia from the fixed ammonia still escapes to the bottom of the free ammonia still through the pipe 11. The still illustrated in Fig. 1 may, in practice, be provided with an alkali washer, or other phenol absorber, etc., such as illustrated in Figs. 2 and 3.

The still illustrated has the vapor outlet pipe 7 for the ammonical vapors from the still. This pipe has two branches, one branch 7ª with suitable regulating valve therein leading directly to the saturator for absorbing the ammonia in sulfuric acid, or leading directly to a phenol absorber for separating the phenolic compounds from the ammoniacal gases before they are further used. Another branch 7ᵇ having regulating valve therein, connects with the reflux condenser or cooler or dephlegmator 7ᶜ, and the vapors from this reflux cooler escape through the pipe 7ᵈ directly to the saturator, or to a phenol absorber and then to a saturator or ammonia absorber. A return pipe 7ᵉ conveys the condensate from the reflux cooler back to the free ammonia still. The reflux condenser or dephlegmator is arranged for indirect contact of the vapors with the cooling liquor. For example, the cooling liquid, such as water at a regulated temperature and in regulated amounts may flow around tubes or pipes through which the vapors ascend, so that the vapors will be cooled, and so that the condensate therefrom will flow downwardly and collect in the bottom of the dephlegmator, and then return to the ammonia still.

In the operation of the apparatus of Fig. 1, the gas liquor is preheated in the preheater 1 to a temperature of 98° C. or higher and is fed at this temperature to the top of the free ammonia still 6. In its passage downwardly through the free ammonia still, the greater part of all of the free ammonia is driven off and escapes through the outlet pipe 7. In addition, part or all of the phenolic compounds are removed with the ammonia, largely if not completely as ammonium phenolates. Vapors of ammonia, etc., set free in the preheater pass through the vent 3ª to the top of the ammonia still and are removed with the vapors therefrom. From the bottom of the free ammonia still the liquor flows into the lime leg where it comes in contact with lime and where the lime reacts with the fixed ammonia compounds to set free the ammonia, the ammonia thus set free is driven off in the fixed ammonia still 10 and the ammonia vapors passed into the bottom of the free ammonia still and upwardly therethrough, assisting in the formation and the carrying off of the phenol compounds as phenolates.

Where the gas liquor treated is rich in ammonia, this ammonia may in itself be sufficient to effect the removal of a large part of the phenolic compounds. Where, however, the normal ammonia content of the liquor is not sufficient, additional ammonia may be supplied to the still, sufficient to effect the removal of an increased amount of the phenolic compounds or even to effect substantially complete removal thereof.

It will be noted that the free ammonia still of Fig. 1 is shown broken away at an intermediate point to indicate an indefinite height of the still. The still may be of the usual height and with the usual number of sections. In order, however, to provide for additional contact of the ammonia vapors with the preheated liquor, the still may advantageously have added sections, in addition to those of the ordinary still, and these will provide an increased scrubbing action of the ammonia vapors rising upwardly through the still through the scrubbing sections and the preheated liquor flowing downwardly through these sections and through the free ammonia still. By increasing this countercurrent flow and scrubbing action, and by maintaining the temperature of both the liquor and the gases and vapors above 98° C., a more complete driving off and removal of phenolic compounds with the ammonia can be obtained.

Where the temperature of the vapors escaping from the top of the free ammonia still is not too high, e. g. is at 103° C. or below, they may be passed directly to a saturator or to a phenol absorber and then to a saturator. Where the vapors are at a higher temperature and contain an increased amount of water vapor, they may advantageously be subjected to a regulated condensing or refluxing operation in the reflux condenser or dephlegmator $7^g$ and the temperature cooled to 103° C. or lower with return of the excess water vapor to the still in a condensed form. The vapors can be cooled to a temperature below 103° C. but should not be cooled to a temperature below 98° C., and the liquor in the bottom of the dephlegmator, and returning to the still, should not be cooled below 98° C. The provision of a dephlegmator, as illustrated in Fig. 1, enables the temperature of the escaping vapors to be regulated and controlled, to remove excess water vapor therefrom, while nevertheless permitting the escape of phenolic compounds with the ammonia, while the provision of a direct connection $7^a$ permits the vapors from the still to be passed directly to a saturator or to a phenol absorber without additional dephlegmation, in which case the temperature of the liquor and vapors in the top of the free ammonia still itself, or in the top of the added scrubbing section superimposed thereon, will determine the moisture content of the escaping vapors. The temperature of both the liquor and the vapors at the outlet from the still should be sufficiently high to prevent reabsorption of phenolic compounds in the liquor, i. e. it should be at 98° C. or higher.

In the apparatus of Fig. 2 the preheater and the free and fixed ammonia stills are given the same reference characters as in Fig. 1, and the still is operated in a similar way, except for the modifications described below.

In Fig. 2 a separate countercurrent scrubber is provided between the gas liquor preheater and the free ammonia still and the preheated liquor is subjected to the total vapors coming from the ammonia still. That is, the gas liquor from the preheater 1 passes through the pipe 3 to the top of the countercurrent scrubber 4 and passes downwardly therethrough, the resulting liquor then passing through the pipe $3^a$ to the top of the free ammonia still. From the top of the free ammonia still the vapors of ammonia, etc., pass through the pipe 5 to the bottom of the countercurrent scrubber 4 and upwardly therethrough countercurrent to the down-flowing preheated liquor. The ammoniacal vapors from the top of the countercurrent scrubber 4 may pass through the pipe 18 directly to a saturator or through the branch pipe 19 to a phenol absorber, such as an alkali washer 20. In this absorber they are brought into intimate contact with an absorbent, e. g. a caustic alkali solution which will decompose the ammonium phenolate and form alkali phenolate. The remaining ammoniacal vapors then pass through the pipe 21 to the condenser or dephlegmator 22 in which they are subjected to cooling and a considerable part of the water vapor separated out as ammoniacal liquor which returns through the pipe 23 to the bottom of the countercurrent scrubber 4. The purified and dried ammonia gas then passes through the pipe 24 and the pipe 18 to the saturator or to other place of treatment or use. The alkali phenolate solution collecting in the washer 20 can be drawn off through the outlet pipe 27 having regulating valve 28 therein. By closing the valves in the pipes 19 and 24, the vapors can be passed directly to a saturator.

In Fig. 2 it will be noted that a phenol absorber is arranged so that the vapors passing from the free ammonia still 6 to the scrubber 4 may be passed through the absorber, or by-passed directly from the still to the scrubber. The connecting pipe 5 has a direct branch $5^a$, with valve therein, by means of which the ammonia vapors from the still can be passed directly to the scrubber. It also has a branch $5^b$ with valve therein, by means of which the vapors can pass to the phenol absorber $5^d$, for the separation of phenolic compounds therein, after which the purified ammonia gases pass through the branch pipe $5^c$ to the scrubber.

This phenol absorber may contain an alkali solution to break up the ammonium phenolate and form alkali phenolate which may be removed from time to time through the outlet pipe 5ᵉ when the solution is to be replenished.

In the operation of the apparatus of Fig. 2 the gas liquor is first preheated to a temperature of 98° C. or higher in the preheater 1 and then passes into the scrubber 4 where its temperature is maintained at 98° C. or higher. In this scrubber it is subjected to the scrubbing action of the vapors escaping from the top of the free ammonia still through the pipe 5. These vapors may include ammonia together with ammonium phenolate or they may have the phenolate removed therefrom by the absorber 5ᵈ. The maintenance of the temperature of the scrubber at 98° C. or higher insures that any ammonium phenolate will not be condensed and held in the scrubber but will be driven off to a large extent if not completely with the ammonia escaping through the pipe 18. The gas liquor thus freed from a considerable part of its ammonia and phenolate enters the top of the free ammonia still where the usual distilling operation takes place, the greater part or all of the remaining free ammonia being set free in the free ammonia still and the fixed ammonia being then set free by the action of lime and distilled in the fixed ammonia still. The ammonia set free in the fixed ammonia still passes upwardly through the free ammonia still and serves to assist in carrying away any remaining phenolic compounds which the liquor contains at this place. By providing a sufficient amount of ammonia in the still or in the scrubber or in both it is possible to effect substantially complete removal of phenolic compounds so that the liquor that comes in contact with the lime in the lime leg will contain no phenolic compounds. Inasmuch as such compounds if present in the liquor coming in contact with the lime will combine with the lime to form calcium phenolate and will be held and prevented from volatilizing, it is important to effect removal more or less completely of the phenolic compounds from the liquor before it comes in contact with the lime.

By operating the phenol absorbers at a high temperature, for example, by using a strong caustic soda solution and heating it to a high temperature, absorption or condensation of water vapor is prevented, and a strong solution of sodium phenolate can be obtained. In the case of the phenol absorber 5ᵈ, this maintenance of the absorbent solution at a high temperature prevents cooling of the ammonia gases entering the bottom of the scrubber 4. In the case of the phenol absorber 20, the hot ammonia and admixed water vapor pass to the dephlegmator or condenser 22 where the vapors are cooled and the ammonia is separated from the greater part of its admixed water vapor. The condensed water together with absorbed and condensed ammonia pass back to the countercurrent scrubber as already pointed out. In addition a further amount of ammonia gas can if desired be returned either to the countercurrent scrubber or to the free ammonia still to increase the amount of phenols driven off, and to effect substantially complete removal of phenols from the liquor. In the apparatus illustrated in Fig. 2 the lime leg is heated by the steam coil 14 having regulating valve 17 therein and the fixed ammonia still by the steam coil 15 having regulating valve 16. An outlet pipe for the waste liquor from the fixed ammonia still is indicated at 12 having valve 13 therein.

When the alkali solution in the washers becomes charged with phenols, they may be drawn off and replenished, and the phenol can be recovered therefrom in any suitable manner, as for example, by acidifying the solution and distilling off the phenol, or the alkali phenolate may be utilized for other purposes.

In the apparatus of Fig. 2, the countercurrent scrubber 4 may be of any suitable construction which will permit effective countercurrent contact between the gases and liquor. In effect, it forms a countercurrent extension of the free ammonia still itself, similar to the added sections on top of Fig. 1. The of the free ammonia still of scrubber, however, provision of a separate countercurrent treatment makes possible the of the preheated gas liquor before it reaches the usual free ammonia still, as well as the freeing of the vapors from phenol before they enter the separate scrubber.

Fig. 3 illustrates a modified apparatus for producing aqua-ammonia and at the same time recovering a large percentage or all of the phenol from the gas liquor.

Gas liquor flows from the feed tank 102 into the scrubber 104 and from thence into the preheater 101 where the liquor is heated to a temperature approximately 98° C. to 99° C. The hot liquor then passes through the pipe 103 and 105 into the free ammonia or volatile still 106, or, if desired, the valve 112 may be closed and the hot liquor pumped under positive pressure by the liquor pump 113. The free ammonia still 106 is maintained at a temperature such that both the liquor and vapors are at or above 98° C. Most of the free ammonia and a large percentage of the phenol as ammonium phenolate is volatilized in the still 106, the liquor passing down into the liming leg 108 while still containing a small percentage of phenol, if the phenol is not completely removed. The lime in the lime leg sets free the combined ammonia and the liquor passes into the fixed ammonia still 110 through the pipe 109. In the fixed ammonia still the ammonia set free by the lime is volatilized and is returned to the volatile still 106 through the pipe 111. An automatic overflow 115, controlled by valves 114 and 116, provides for the overflow of liquor from the fixed ammonia still.

The vapors containing ammonia and phenolate from the free ammonia still pass through a pipe 107 into the alkali washer 120 where the ammonium phenolate is decomposed and the phenol removed from the vapors in the form of alkali phenolate, which is withdrawn from time to time and the phenol recovered as above described. The phenol-free vapors from the alkali washer pass through pipe 121 into the ammonia condenser 122 where most of the water is condensed out and flows into the evaporators 118 through pipe 117. The ammonia from the condenser passes into the water washer 123 through the pipe 124 and the ammonia dissolved in the condensate is led from the evaporators 118 into the water washer through pipe 125.

The ammonia is then washed as usual with oil in the oil washer 126, with the monitor 127, and is filtered in the charcoal filter 128 and bone black filter 129 and finally passed into the absorbers 130 and 131, where it is absorbed in distilled water supplied from the tank 132.

It will be seen that the apparatus of Fig. 3 differs from the usual aqua-ammonia plant in that the dephlegmator is removed from the top of the ammonia still and an alkali washer is introduced between the top of the ammonia still and the dephlegmator or condenser. This permits the free ammonia still to be operated at a higher temperature and without refluxing and return of water and phenolate to the still, and permits the ammonia with admixed water vapor and phenolate to pass over to the alkali washer where the phenolate is decomposed and the phenol absorbed as alkali phenolate before the ammonia is subjected to condensation to remove the admixed water vapor therefrom. This removal of the condensers to a distance from the still and the introduction of an alkali washer between the still and condenser, together with the operation of the still itself at a sufficiently high temperature, permits the phenolate to be removed from the still with the ammonia and to be recovered before the ammonia is subjected to condensation to remove the water vapor therefrom. By operating the alkali washer at a high temperature, the water vapor is prevented from condensing in the washer and from diluting the alkali solution.

While the apparatus illustrated in Fig. 3 has the usual dephlegmator removed from the top of the ammonia still, the dephlegmator can nevertheless be used in the manner described in connection with Fig. 1. Instead, however, of cooling the ammonia vapors in the manner in which they are cooled in aqua-ammonia plants, to separate as much water vapor as possible from them, the dephlegmating or reflux cooling of the vapors is regulated and maintained at a temperature above 98° C. so as to avoid reabsorption of ammonium phenolates. Where such a dephlegmator is provided, a temperature considerably higher than 98° C. can be maintained in the free ammonia still, and the dephlegmator can be relied upon to cool the vapors down to a temperature such that excessive amounts of water vapor are removed, but ammonium phenolate nevertheless permitted to pass off with the ammonia.

The apparatus of Fig. 4 is a modified apparatus in which the preheated gas liquor is brought into contact with the total ammonia evolved from the gas liquor without recycling of ammonia vapor. In this figure, the same reference numerals are used as in Figs. 1 and 2 for corresponding parts of the apparatus, with the suffix "b" appended thereto in certain cases.

In this apparatus, the gas liquor from the preheater charge passes at a temperature of 98° C. or higher to the top of the free ammonia still 6$^b$ and flows downwardly therethrough. From the bottom of the free ammonia still the liquor flows through the pipe 3$^c$ to the top of the countercurrent scrubber 4, in which the liquor is maintained at a temperature of 98° C. or higher. The liquor flows downwardly through the scrubber and leaves the base of the scrubber through the pipe 3$^d$, through which it is pumped by the pump 3$^e$, to the lime leg 8 of the ammonia still, and then through the regular fixed still. The ammoniacal vapor from the free ammonia still passes off through the pipe 5$^c$ to the bottom of the countercurrent scrubber 4 and passes upwardly therethrough countercurrent to the liquor.

The general arrangement of the apparatus of Fig. 4 is similar to that of Fig. 2 except for the different arrangement of the countercurrent scrubber with reference to the ammonia still. In the apparatus of Fig. 2, the preheated liquor first enters the scrubber and then passes to the free ammonia still; while in the apparatus of Fig. 4, the liquor is first preheated and passes to the free ammonia still and subsequently to a countercurrent scrubbing before it enters the lime leg. In the apparatus of Fig. 4, the ammonia set free in the fixed ammonia still passes upwardly through the free ammonia still and the ammoniacal vapors are taken off from the top of the free ammonia still at a temperature sufficiently high to insure the carrying off of phenolic compounds with the ammonia, i. e., a temperature of 98° C. or higher. The total amount of ammonia is then caused to pass countercurrent to the liquor in the scrubber 4.

A phenol absorber $5^d$ may be provided in Fig. 4 similar to the phenol absorber $5^d$ in Fig 2. By proper manipulation of the valves in the pipe $5^a$, $5^b$, and $5^c$, the phenol absorber can be omitted or included as desired. When the gases from the free ammonia still are passed through the phenol absorber (containing for example, a solution of caustic soda), the ammonium phenolate will be decomposed, the phenol will be combined with the caustic soda as sodium phenolate, and the ammonia set free will be carried along with the other ammonia into the countercurrent scrubber. By purifying the ammonia in this way, the liquor in the scrubber will be subjected to the countercurrent action of the ammonia and, by maintaining the scrubber at a temperature of 98° C. or higher, further opportunity is presented for the ammonia to combine with and carry away the phenolic compounds as phenolate. The phenolic compounds carried over from the scrubber through the lime 18 can be treated, for example, as described in connection with Fig. 2 above. Where the amount of phenolic compounds in the liquor is small with reference to ammonia content, the phenol absorber $5^d$ may be omitted and the ammonia may be sufficient in such case to effect substantially complete removal of the phenol. With the phenol absorber available for use where desired, and with the arrangement of Fig. 4, substantially complete removal of phenolic compounds can be effected, particularly where the gas liquor is high in ammonia; and this can be effected without recycling of ammonia.

In the apparatus of Fig. 3, as well as in the apparatus of Figs. 1, 2 or 4, where the normal ammonia content of the gas liquor is low or is insufficient to effect complete removal of phenolic compounds as ammonium phenolate, additional ammonia may be supplied to the still to increase the phenolic recovery. Even without the addition of ammonia, however, an important recovery of phenols can be obtained, particularly from gas liquor which is itself rich in ammonia. Where the ammonia content in the still is to be increased, the ammonia may advantageously be that which is recovered from the process itself, after purification from admixed phenolate. We do not however, claim herein apparatus for carrying out a cyclic process in which the ammonia is so purified and returned to the still, inasmuch as such cyclic apparatus forms the subject of a separate application. With such cyclic operation, it is readily possible to recycle sufficient ammonia to insure that substantially all of the phenolic compounds will be driven off so that they may be recovered, and so that the waste liquor from the still will be freed from objectionable phenolic constituents. Even without such recycling of ammonia, however, and particularly if the gas liquor is itself rich in ammonia, the apparatus of the present invention permits the recovery of important amounts of phenol from the gas liquor which are normally lost and not recovered. The present apparatus, accordingly, provides for a new means by which the recovery of phenols may be effected, and, to the extent that the phenols are recovered, the waste liquor is freed from objectionable phenolic constituents.

The modified apparatus shown in Fig. 5 is similar to the apparatus in Fig. 2, with the addition of a dephlegmator $5^h$ arranged between the free ammonia still and the scrubber. This dephlegmator is connected by means of the pipes $5^f$ and 5, and a by-pass pipe $5^i$ is provided having valve $5^k$ therein. The pipe $5^f$ has valve $5^g$ therein. The arrangement of pipes and valves is such that the offcoming gases from the still may be either by-passed directly to the scrubber, or passed through the dephlegmator. A pipe $5^m$ connects the bottom of the dephlegmator with the top of the scrubber.

In the operation of the free ammonia still at the higher temperatures, e. g., around 103° C., a considerable amount of water vapor passes with the other vapors from the top of the still. When the offcoming vapors are passed through the dephlegmator $5^h$, this water vapor is largely condensed along with the phenol compounds, leaving practically free ammonia gas to pass from the top of the dephlegmator to the bottom of the scrubber. The condensate passes from the bottom of the dephlegmator through the pipe $5^m$ into the top of the scrubber where the phenol compounds will be most readily carried off through the pipe 18 by the ammonia gas passing up through the scrubber. The operation of the system of Fig. 5 is otherwise the same as previously described in connection with the operation of Fig. 2.

We claim:

1. An apparatus for treating gas liquor, comprising an ammonia still having heating means sufficient to heat the liquor in the upper portion of the still to a temperature sufficiently high to drive off phenolic compounds with the ammonia, a phenol absorber arranged to remove phenolic compounds from the vapors from the still, and a condenser or dephlegmator for removing water vapor from the purified ammonia.

2. An ammonia still provided with a preheater and a vapor line connecting the preheater with the top of the still, whereby vapors driven off from the preheater are introduced into the still.

3. An apparatus for treating gas liquor for the recovery of ammonia, comprising a preheater, a scrubber and an ammonia still, together with means for passing the ammoniacal vapors from the still through the preheated liquor to the scrubber.

4. An apparatus for treating gas liquor comprising an ammonia still, a preheater for the gas liquor, means for scrubbing the preheated gas liquor with the ammonia given off from the ammonia still, and a phenol absorber arranged to remove the phenolic compounds from the ammonia, escaping from the still before it comes in contact with the preheated gas liquor.

5. An apparatus for treating gas liquor comprising an ammonia still, a preheater for the gas liquor and a counter-current scrubber, the ammonia still having free and fixed ammonia sections and the scrubber being arranged for the circulation of the liquor therethrough after it leaves the free ammonia section and before it enters the fixed ammonia section, and means for passing vapors from the free ammonia still through the scrubber.

6. An apparatus for treating gas liquor for the recovery of ammonia, comprising a preheater, a scrubber, an ammonia still and means between the ammonia still and the scrubber for condensing water vapor and phenol compounds and introducing them into the scrubber.

7. An apparatus for treating gas liquor comprising an ammonia still, a preheater for the gas liquor, means for scrubbing the preheated gas liquor, a dephlegmator for condensing water vapor and phenol compounds, a connection between the ammonia still and dephlegmator, a connection between the top of the dephlegmator and the scrubber and means for introducing condensed water and phenol compounds which accumulate in the dephlegmator into the top of the scrubbing means.

In testimony whereof we affix our signatures.

LE ROY WILBUR HEFFNER.
WILLIAM TIDDY.